(12) United States Patent
Kim et al.

(10) Patent No.: US 9,831,729 B2
(45) Date of Patent: Nov. 28, 2017

(54) ELECTRIC MOTOR'S SECTIONAL ROTOR WITH ASYMMETRIC POLES HAVING PERMANENT MAGNETS

(71) Applicant: SAMSUNG ELECTRONICS CO., LTD., Suwon-si (KR)

(72) Inventors: Sung-Il Kim, Yongin-si (KR); Sung-Hyuk Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 587 days.

(21) Appl. No.: 13/675,648

(22) Filed: Nov. 13, 2012

(65) Prior Publication Data

US 2013/0181566 A1 Jul. 18, 2013

(30) Foreign Application Priority Data

Jan. 16, 2012 (KR) .......................... 10-2012-0004987

(51) Int. Cl.
*H02K 1/27* (2006.01)

(52) U.S. Cl.
CPC ............. *H02K 1/274* (2013.01); *H02K 1/276* (2013.01); *H02K 1/278* (2013.01); *H02K 2201/15* (2013.01)

(58) Field of Classification Search
CPC .... H02K 2201/15; H02K 1/278; H02K 1/276; H02K 1/274; H02K 1/27; H02K 21/46
USPC ............. 310/156.56, 156.57, 156.58, 156.38
See application file for complete search history.

(56) References Cited

U.S. PATENT DOCUMENTS

| | | | | |
|---|---|---|---|---|
| 4,327,302 A | * | 4/1982 | Hershberger | 310/156.56 |
| 5,010,266 A | * | 4/1991 | Uchida | 310/156.22 |
| 6,717,323 B1 | | 4/2004 | Soghomonian et al. | |
| 6,800,977 B1 | * | 10/2004 | Ostovic | 310/156.38 |
| 6,885,122 B2 | * | 4/2005 | Kaneko et al. | 310/156.38 |
| 6,987,342 B2 | * | 1/2006 | Hans | 310/156.56 |
| 7,196,446 B2 | * | 3/2007 | Hans | 310/156.53 |
| 7,425,808 B2 | | 9/2008 | Kamiya | |
| 7,535,146 B2 | | 5/2009 | Ackva et al. | |
| 7,646,125 B2 | * | 1/2010 | Okamoto | H02K 1/276 310/156.53 |
| 7,868,502 B2 | * | 1/2011 | Lee | H02K 1/276 310/156.48 |
| 8,653,710 B2 | | 2/2014 | Takahashi et al. | |
| 2004/0112655 A1 | | 6/2004 | Matsunobu et al. | |

(Continued)

FOREIGN PATENT DOCUMENTS

| | | |
|---|---|---|
| CN | 1659768 A | 8/2005 |
| CN | 1901334 A | 1/2007 |

(Continued)

OTHER PUBLICATIONS

Machine Translation of DE 10-2005-047-771 A1.*

(Continued)

*Primary Examiner* — Burton Mullins
(74) *Attorney, Agent, or Firm* — Sughrue Mion, PLLC (57) ABSTRACT

A rotor is and a motor including the rotor and a stator are provided. The rotor includes a rotor core and rotor poles. The rotor poles are arranged circumferentially around the rotor core, and each of the rotor poles is formed in an asymmetric shape. The stator is spaced apart from the rotor and includes slots which are configured so that a coil may be wound around the slots.

3 Claims, 7 Drawing Sheets

(56) References Cited

U.S. PATENT DOCUMENTS

| | | | |
|---|---|---|---|
| 2004/0212266 A1* | 10/2004 | Hans | 310/156.56 |
| 2005/0258700 A1* | 11/2005 | Fratta | 310/162 |
| 2008/0231135 A1* | 9/2008 | Suzuki et al. | 310/156.53 |
| 2009/0134732 A1* | 5/2009 | Shichijoh | H02K 1/276 |
| | | | 310/156.53 |
| 2010/0141076 A1 | 6/2010 | Blissenbach et al. | |
| 2010/0148612 A1* | 6/2010 | Takemoto et al. | 310/156.53 |
| 2010/0213781 A1 | 8/2010 | Rahman et al. | |
| 2011/0169364 A1 | 7/2011 | Maemura et al. | |
| 2011/0309706 A1* | 12/2011 | Takahashi et al. | 310/156.53 |
| 2012/0091845 A1* | 4/2012 | Takemoto et al. | 310/156.01 |
| 2012/0169171 A1* | 7/2012 | Jansen et al. | 310/156.49 |

FOREIGN PATENT DOCUMENTS

| | | | | |
|---|---|---|---|---|
| CN | 1951013 A | | 4/2007 | |
| CN | 101478212 A | | 7/2009 | |
| CN | 101771315 A | | 7/2010 | |
| CN | 101820238 A | | 9/2010 | |
| CN | 201910684 U | | 7/2011 | |
| CN | 102214962 A | | 10/2011 | |
| DE | 37 42 502 A1 | | 6/1989 | |
| DE | 102005047771 A1 | * | 4/2007 | H02K 1/27 |
| DE | 102009046716 A1 | | 5/2011 | |
| EP | 0 333 869 A1 | | 9/1989 | |
| EP | 0803962 A1 | * | 9/2000 | H02K 1/27 |
| EP | 1130740 A2 | | 9/2001 | |
| GB | 1324147 | * | 7/1973 | H02K 1/27 |
| JP | 5137304 A | | 6/1993 | |
| JP | 9-9537 A | | 1/1997 | |
| JP | 2003-189567 A | | 7/2003 | |
| JP | 2004-328992 A | | 11/2004 | |
| JP | 2006223052 A | | 8/2006 | |
| JP | 2008-182825 A | | 8/2008 | |
| JP | 2009-268204 A | | 11/2009 | |
| JP | 2010-45974 A | | 2/2010 | |
| JP | 2010-148235 A | | 7/2010 | |
| JP | 2011-167055 A | | 8/2011 | |
| JP | 2011-223742 A | | 11/2011 | |
| KR | 10-0603645 | | 7/2006 | |
| KR | 10-2011-0000010 A | | 1/2011 | |
| WO | WO 2010/070900 A1 | * | 6/2010 | H02K 1/27 |
| WO | 2010110150 A1 | | 9/2010 | |

OTHER PUBLICATIONS

Machine translation of JP H05-137304 A.*
English Machine Translation of Kurihara, JP 2009-268204, Nov. 12, 2009.*
Communication dated Mar. 12, 2015 by the European Patent Office in related Application No. 12184565.5.
Communication dated Mar. 22, 2016, issued by the Japanese Patent Office in counterpart Japanese Application No. 2012-235673.
Communication dated Apr. 15, 2016, issued by the State Intellectual Property Office of P.R. China in counterpart Chinese Application No. 201210467063.9.
Communication dated Oct. 25, 2016, issued by the State Intellectual Property Office of P.R. China in counterpart Chinese Application No. 201210467063.9.
Communication dated Nov. 8, 2016, issued by the Japanese Patent Office in counterpart Japanese Application No. 2012-235673.
Communication dated Apr. 14, 2017 issued by the State Intellectual Property Office of the People's Republic of China in counterpart Chinese Application No. 201210467063.9.

* cited by examiner

FIG. 7

ELECTRIC MOTOR'S SECTIONAL ROTOR WITH ASYMMETRIC POLES HAVING PERMANENT MAGNETS

CROSS-REFERENCE TO RELATED APPLICATION

This application claims priority under 35 U.S.C. §119(a) from Korean Patent Application No. 10-2012-0004987, filed on Jan. 16, 2012, in the Korean Intellectual Property Office, the entire disclosure of which is incorporated herein by reference in its entirety.

BACKGROUND

1. Field

Apparatuses consistent with exemplary embodiments relate to a motor used in various industrial fields, such as electric vehicles and home appliances, to convert electrical energy into mechanical energy.

2. Description of Related Art

Hybrid vehicles and electric vehicles have gained more popularity due to harmful environmental effects from the air pollution and an increasing shortage of fossil fuels. Hybrid vehicles use internal-combustion engines to generate power and use electric motors as auxiliary power sources. Electric vehicles use electric motors as their main power sources.

With the development of technologies for a battery and a motor, it is expected that an electric vehicle, known as a pollution-free car, will substitute for "transition" vehicles, such as hybrid cars, since electric vehicles emit no pollutants or carbon dioxide while driving.

The motor of an electric vehicle which functions as an engine converts electric energy supplied from a battery into mechanical energy. Thus, the performance of the battery and the motor is one of the most important factors in determining the power and driving distance of the electric vehicle. Accordingly, to achieve an increase in the power and driving distance of an electric vehicle, an improvement in power density and efficiency of the motor, as well as an enhancement of battery performance, are considered important.

Further, the growing concern of global pollution and its effect on the environment and the introduction of a low-carbon economy have brought the issue of a high efficiency system into a wide range of fields including home appliances and electric automobiles. Therefore, implementation of a high-efficiency motor as a core driving source of a system is increasingly needed.

SUMMARY

According to an aspect of one exemplary embodiment, there is provided a rotor comprising: a rotor core; and a plurality of rotor poles arranged circumferentially around the rotor core, wherein each of the rotor poles is formed in an asymmetric shape.

According to an aspect of another exemplary embodiment, there is provided a rotor comprising: a rotor core; and a plurality of rotor poles arranged circumferentially around the rotor core, wherein an outer portion of the rotor core corresponding to each rotor pole is formed eccentrically.

According to an aspect of another exemplary embodiment, there is provided a motor comprising: a rotor comprising a rotor core and rotor poles arranged circumferentially around the rotor core, wherein each of the rotor poles is formed in an asymmetric shape; and a stator spaced apart from the rotor, the stator comprising slots configured for a coil to be wound therearound.

According to an aspect of another exemplary embodiment, there is provided a motor comprising: a rotor comprising a rotor core, a plurality of rotor poles arranged circumferentially around the rotor core, wherein an outer portion of the rotor core corresponding to each rotor pole is formed eccentrically; and a stator spaced apart from the rotor, the stator comprising slots configured for a coil to be wound therearound.

BRIEF DESCRIPTION OF THE DRAWINGS

These and other exemplary features and aspects will become apparent from the following detailed description of exemplary embodiments, taken in conjunction with the accompanying the drawings in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
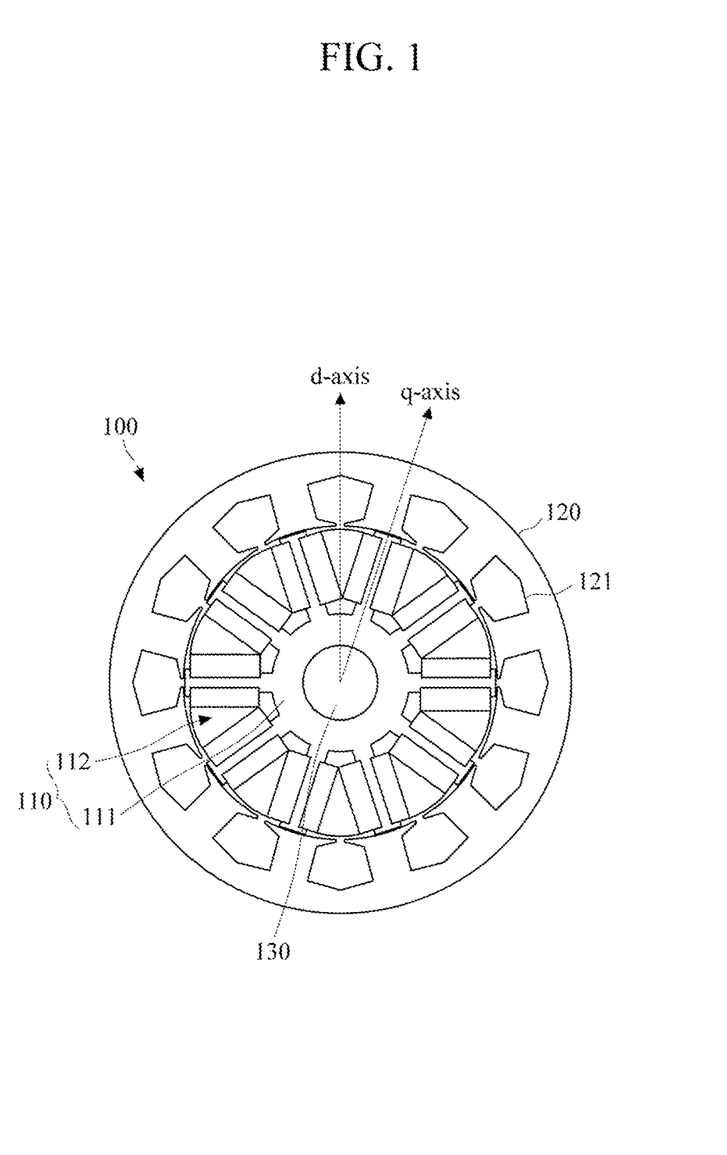
FIG. 1 is a diagram illustrating a cross-sectional view of an exemplary motor.
Figure 2:
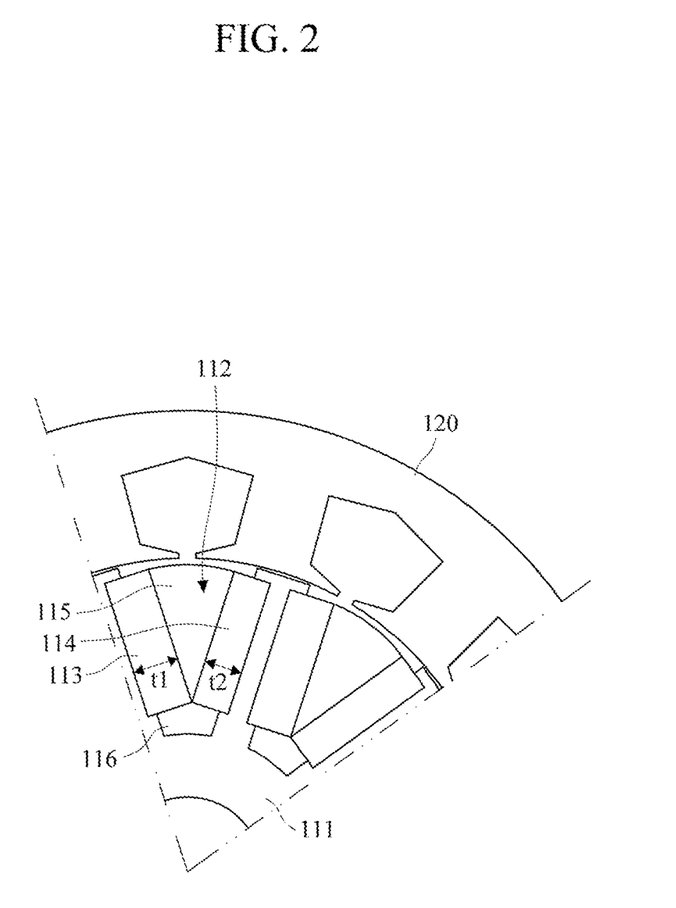
FIG. 2 is a diagram illustrating a partial cross-sectional view of the motor shown in FIG. 1.
Figure 3:
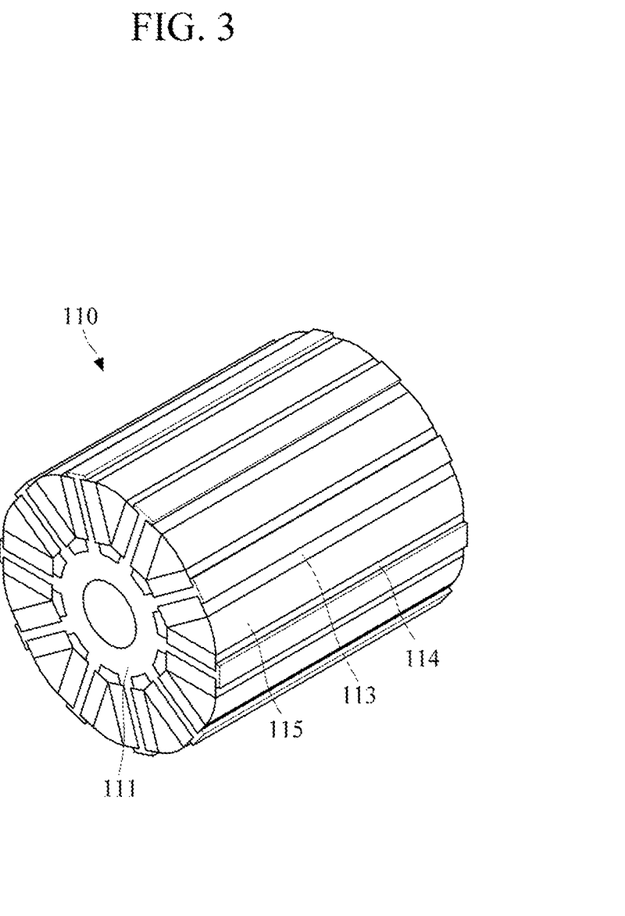
FIG. 3 is a diagram illustrating a perspective view of a rotor included in the motor shown in FIG. 1.

FIG. 1 illustrates an exemplary cross-sectional view of a motor. FIG. 2 illustrates a partial cross-sectional view of the motor shown in FIG. 1. FIG. 3 illustrates a perspective view of a rotor included in the motor shown in FIG. 1.

Referring to FIGS. 1 to 3, the motor 100 may include a rotor 110 and a stator 120.

The rotor 110 may include a rotor core 111 and a plurality of rotor poles 112. The rotor core 111 may be made of a soft magnetic material. The rotor core 111 may have a through-hole passing through its center along a length direction. A shaft 130 may be inserted into and coupled to the through-hole. Accordingly, as the rotor 110 turns, the shaft 130 rotates along with the rotor 110. The shaft 130 may be made of a non-magnetic material.

The rotor poles 112 are arranged along a circumferential direction of the rotor core 111. The rotor poles 112 may be embedded in the rotor core 111, being spaced at a predetermined distance from one another. Alternately, the rotor poles may be simply attached to the rotor core. There may be an even number of rotor poles 112. On the outer circumference surface of the rotor core 111, one of two neighboring rotor poles 112 functions as an N-pole and the other rotor pole 112 functions as an S-pole. The rotor poles 112 may be arranged at a predetermined distance from one another.

Each rotor pole 112 may be designed to be asymmetric to improve the saliency ratio. The saliency ratio is a ratio of q-axis inductance to d-axis inductance. For example, each rotor pole 112 may include a first permanent magnet 113 and a second permanent magnet 114. The first permanent magnet 113 and the second permanent magnet 114 may be spaced apart from each other and may each be partially embedded in the rotor core 111. For example, one end of the first permanent magnet 113 may be positioned more inside the rotor core 111 than the other end and one end of the second permanent magnet 114 may be positioned more inside the rotor core 111 than the other end. In other words, as shown in FIG. 2, an end of a magnet that is closer to the shaft is laterally implanted into the rotor core to a depth greater than that of the opposite end of the magnet, farther from the rotor core.

As shown in FIG. 3, the first permanent magnet 113 and the second permanent magnet 114 may extend along a rotational axis of the rotor core 111, each having a predefined cross-sectional area. The cross-sectional area of each of the first and the second permanent magnets 113 and 114 are defined by cutting the first and second permanent magnets 113 and 114 along a direction perpendicular to the rotational axis of the rotor core 111.

The first permanent magnet 113 has a different cross-sectional area from the second permanent magnet 114. To this end, a thickness t1 of the first permanent magnet 113 may be set to be different from a thickness t2 of the second permanent magnet 114. For example, the first permanent magnet 113 may be formed to have the thickness t1 greater than the thickness t2 of the second permanent magnet 114. In this example, if the first permanent magnet 113 increases in thickness, the thickness t2 of the second permanent magnet 114 may be reduced by the same amount as the increment of the first permanent magnet 113, so that the total amount of the first and the second permanent magnets 113 and 114 can be maintained. In other words, a total cross-sectional area of the first and second magnets, in a cross-section perpendicular to the rotational axis of the rotor core, is fixed at a predetermined total, such that if the thickness of one of the magnets is increased, thus increasing the cross-sectional area of that magnet, the thickness of the other magnet is decreased, this decreasing the cross-sectional area of that magnet.

In another example, a length of the first permanent magnet 113 may be different from a length of the second permanent magnet 114, or the first permanent magnet 113 may have a different thickness and a different length than the second permanent magnet 114.

A space between one end of the first permanent magnet 113 and one end of the second permanent magnet 114 may be narrower than a space between the other end of the first permanent magnet 113 and the other end of the second permanent magnet 114, and thereby the first permanent magnet 113 and the second permanent magnet 114 can be disposed in a v-shaped arrangement. In yet another example, the first and the second permanent magnets 113 and 114 may be disposed in parallel to each other. Thus, the arrangement of the first and the second permanent magnets 113 and 114 is not limited to the aforementioned examples. The first permanent magnet 113 and the second permanent magnet 114 may be disposed having their N poles or S poles facing each other. The first permanent magnet 113 and the second permanent magnet 114 may be formed of a hard magnet material.

A stator 120 is placed apart from the rotor 110. In the case of an inner-type rotor 110, the stator 120 may be a cylindrical-shape having a hollow. The rotor 110 may be rotatably inserted into the hollow of the stator 120. The stator 120 may include slots 121 for a coil to be wound around. As current flows through the coil, the stator 120 generates a rotational magnetic field.

In addition, a division core 115 may be interposed between the first permanent magnet 113 and the second permanent magnet 114. Like the rotor core 111, the division core 115 may be made of a magnetic material. In addition, a connection portion 116 may connect ends of the first and second permanent magnets 113 and 114 to each other. The connection portion 116 may be disposed inside the rotor core 111. The connection portion 116 may be made of a non-magnetic material or may be simply air. Accordingly, the connection portion 116 is able to prevent magnetic flux leakage. As another example, the connection portion 116 may have a central portion made of a magnetic material and the rest formed of non-magnetic material or air. In a case in which the central portion is made of a magnetic material and the rest of the connection portion 116 is made of air, the central portion of the connection portion 116 may be secured to the rotor core by a fixing member formed of a non-magnetic material.

Figure 4:
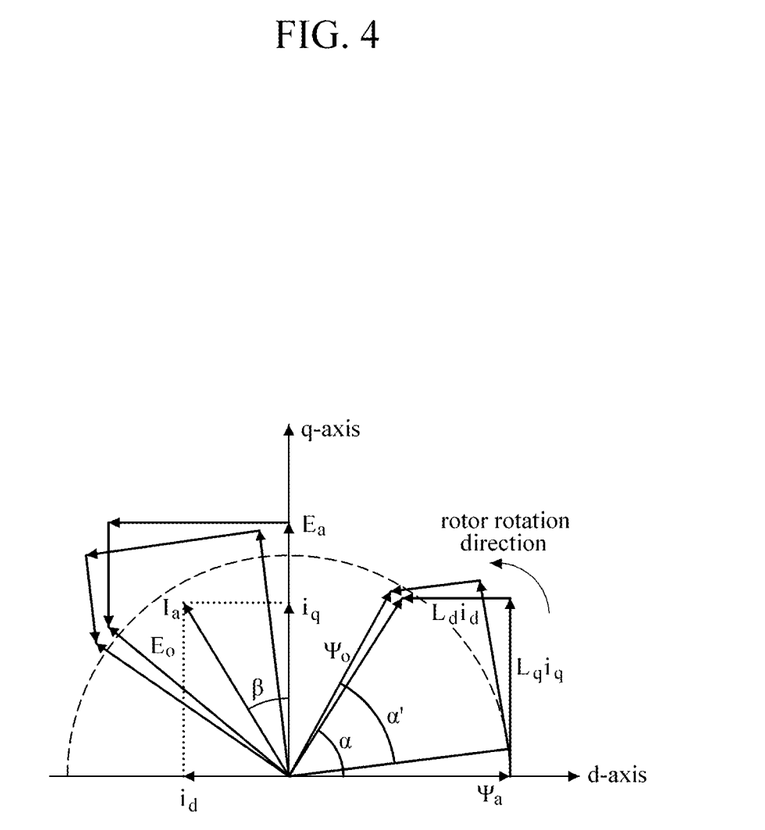
FIG. 4 is a diagram illustrating an example of a vector diagram showing an increase of a saliency ratio with respect to the asymmetric shape of a rotor pole according to an exemplary embodiment.

The saliency ratio increases since each rotor pole 112 is designed as an asymmetric pole, and this increase may be described in detail with reference to Equation 1 below and FIG. 4. Equation 1 is used to compute the torque of a motor. FIG. 4 illustrates an example of a vector diagram showing the increase of the saliency ratio with respect to the asymmetric shape of a rotor pole.

$$T = P_n\{\Psi_a i_q + (L_d - L_q)i_d i_q\} \qquad (1)$$
$$= T_m + T_r$$

Here, T denotes a torque, $p_n$ denotes a pole pair, $\Psi_a$ denotes no-load flux-linkage, $i_d$ denotes a d-axis current, $L_d$ denotes a d-axis inductance, $i_q$ denotes a q-axis current, and $L_q$ denotes a q-axis inductance.

In the right side of Equation 1, the term $P_n \times \Psi_a \times i_q$ represents a magnetic torque $T_m$ and the term $P_n \times (L_d - L_q) \times i_d \times i_q$ represents a reluctance torque $T_r$. The magnetic torque $T_m$ is a torque caused by a magnetic attraction force between the permanent magnet of the rotor and a corresponding rotor magnetic field of the stator. The reluctance torque $T_r$ is a torque caused by a magnetic body that is characterized in being arranged in a direction which minimizes the reluctance of a magnetic circuit in a magnetic field.

Generally, $L_q$ is greater than $L_d$. Thus, a value of $(L_d - L_q)$ is normally a negative (−) value. Since $i_d$ is a negative (−) value and $i_q$ is a positive (+) value, the reluctance torque $T_r$ is a positive (+) value. Therefore, as the value of $(L_d - L_q)$ increases, so does the reluctance torque Tr.

In FIG. 4, each of α and α' represents a phase difference, $I_a$ represents a phase current, β represents a current angle, $\Psi_o$ represents load flux-linkage, $E_a$ represents a no-load counter electromotive force, and $E_o$ represents a load counter electromotive force.

Given that usage rates of the permanent magnets of each rotor pole are the same, a phase difference is reduced from α to α' along the rotational direction of the rotor if the design of the rotor pole is to be asymmetric, as shown in FIG. 4. In this example, because there is no change in the usage rates of the permanent magnets, the load flux-linkages $\Psi_a$ and $\Psi_o$ are substantially the same in the symmetric and asymmetric designs. Because there is scarcely a change in the reluctance of a q-axis magnetic circuit, a value of $L_q \times i_q$ does not hardly change in the symmetric and asymmetric designs. Here, $i_q$ is an unchangeable value, thus the q-axis inductance is substantially the same.

In contrast, since the reluctance of a d-axis magnetic circuit increases, a value of $L_d \times i_d$ becomes smaller. In this case, because $i_d$ is an unchangeable value, the d-axis inductance is reduced. Consequently, the saliency ratio can be increased. That is, the reduction in the d-axis inductance leads to the increase in the value of $L_d - L_q$, and accordingly, the reluctance torque $T_r$ among torque components is raised.

Hence, when the same amount of permanent magnets are used, the asymmetric rotor pole maintains the counter electromotive force at the same level and accomplishes a more reluctance torque $T_r$, compared to a symmetric rotor pole, so that the power density and efficiency of the motor 100 can be enhanced. In addition, the reduction of the d-axis inductance in the asymmetric rotor pole enables an increase in the number of turns of the coil wound around the stator 120 within a given voltage range, thereby providing a high degree of freedom in design.

The example in FIG. 4 shows the decrease in the d-axis inductance as the rotor 110 turns counter-clockwise, and the same result will be shown when the rotor 110 turns clockwise. The configuration of the asymmetric rotor pole 112 may be applicable to an out-type rotor, and thus it may not be limited thereto.

Figure 5:
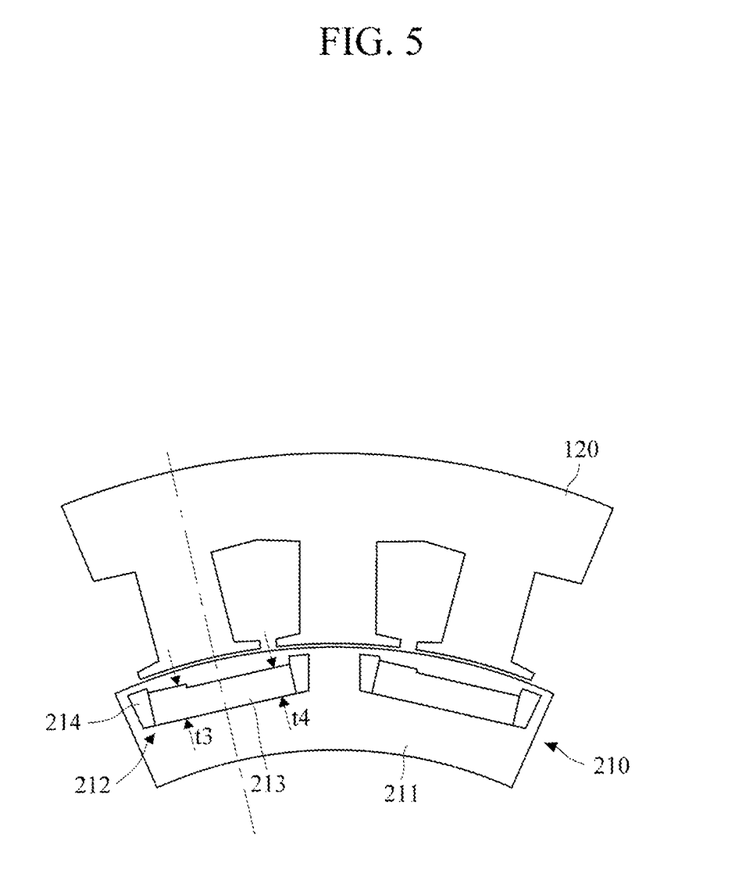
FIG. 5 is a diagram illustrating a partial cross-sectional view of another exemplary a rotor included in a motor.

FIG. 5 illustrates a partial cross-sectional view of another example of a rotor included in a motor.

Referring to FIG. 5, a rotor pole 212 of a rotor 210 may include at least one permanent magnet 213 extending in a direction perpendicular to a center axis along a radial direction of a rotor core 211. The permanent magnet 213 may be embedded in the rotor core 211. The right portion and the left portion of the permanent magnet 213, with respect to the center axis along the radial direction of the rotor core 211, may have different thicknesses, so that the permanent magnet 213 can be in an asymmetric shape.

For example, a thickness t3 of the left-hand portion of the permanent magnet 213 may be greater than a thickness t4 of the right-hand portion. As shown in FIG. 5, the thickness t3 may be consistent over the length of the left-hand portion, and the thickness t4 may be consistent over the length of the right-hand portion. It is certainly possible to form the right-hand portion of the permanent magnet 213 to be thicker than the left-hand portion. As such, the asymmetric permanent magnet 213 may enable an increase in saliency ratio as described above.

The rotor core 211 may include flux barriers 214. The flux barrier 214 may be in contact with each end of the permanent magnet 213. The flux barrier 214 may prevent flux leakage of the permanent magnet 213.

Figure 6:
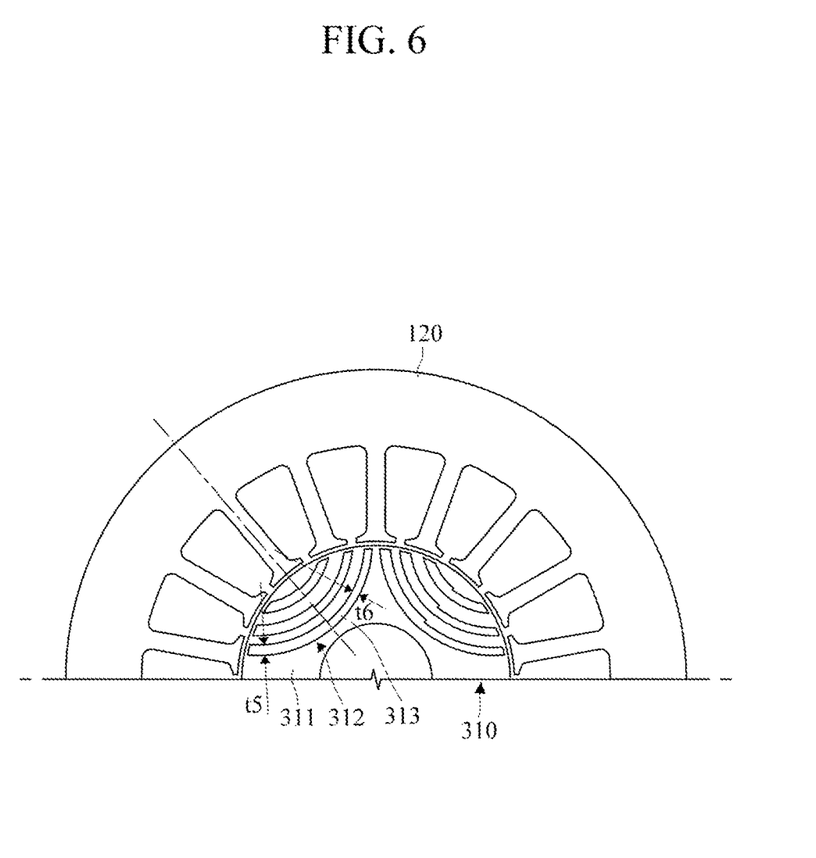
FIG. 6 is a diagram illustrating a partial cross-sectional view of another exemplary a rotor included in a motor.

FIG. 6 illustrates a partial cross-sectional view of another exemplary a rotor included in a motor.

Referring to FIG. 6, a rotor pole 312 of a rotor 310 may include one or more flux barriers 313. In this example, the rotor pole 312 does not include a permanent magnet. The flux barrier 313 may be disposed inside the rotor core 311, generating a reluctance torque in association with a stator 120. The flux barrier 313 is formed to have different thicknesses between the right portion and the left portion with respect to a center axis along a radial direction of a rotor core 311, thereby resulting in an asymmetric shape.

For example, a thickness t5 of the left-hand portion of the flux barrier 313 may be greater than a thickness t6 of the right-hand portion. Alternately, it is possible to form the right-hand portion of the flux barrier 313 to be thicker than the left-hand portion. Accordingly, the asymmetric flux barrier 313 may enable an increase in saliency ratio as described above.

In the case of a plurality of flux barriers 313 being included in each rotor pole 312, each set of flux barriers 313 may be disposed along the same radial direction of the rotor core 311, such that the flux barriers 313 overlap in the radial direction of the rotor core 311, each flux barrier 313 being bent at the center, protruding toward a center of the rotor core 311. The shape of the flux barrier 313 may vary as long as it can implement the aforementioned functions.

Figure 7:
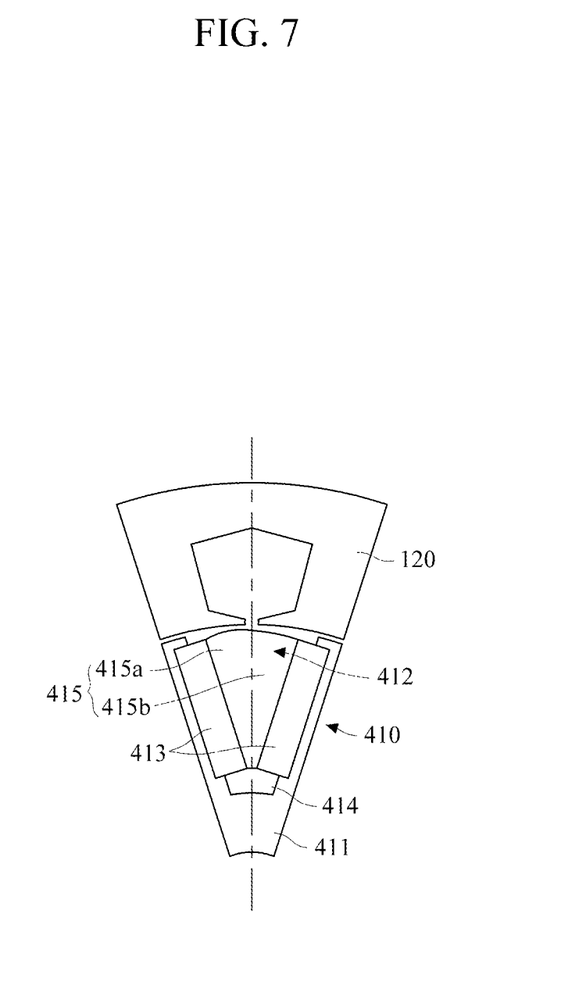
FIG. 7 is a diagram illustrating a cross-sectional view of another exemplary a rotor included in a motor.

FIG. 7 illustrates a cross-sectional view of another exemplary rotor included in a motor.

Referring to FIG. 7, an outer portion of a rotor core 411 of a rotor 410 that corresponds to a rotor pole 412 is formed eccentrically to increase the saliency ratio. For example, the rotor pole 412 may include a pair of permanent magnets 413 having the same size and shape. The permanent magnets 413 may be embedded in the rotor core 411 and be connected to each other by a connection portion 414.

In addition, the rotor core 411 may include a division core 415 interposed between the pair of permanent magnets 413. In this example, the left-hand portion 415a and the right-hand portion 415b of the division core 415, shown in FIG. 7 as separated by the broken line extending in a radial direction of the rotor core and equidistant between the magnets 413, may have different cross-sectional areas with respect to a center axis along a radial direction of the rotor core 411, thereby allowing the rotor core 411 to be eccentric.

For example, the left-hand portion 415a of the division core 415 may protrude more to a stator 120 than the right-hand portion 415b. Alternately, it is possible to form the right-hand portion 415b to protrude more to the stator 120 than the left-hand portion 415a. As such, the eccentricity of the division core 415 enables an increase in the saliency ratio as described above.

The eccentric configuration of the rotor core 411 may be applicable to the rotor 210 shown in FIG. 5. In this case, the permanent magnet 213 may be formed in a symmetric shape with respect to the center axis of the permanent magnet 213. In addition, the eccentric configuration of the rotor core 411 may be applicable to the rotor 310 shown in FIG. 6. In this case, each flux barrier 312 may be formed in a symmetric shape with respect to the center axis of the flux barrier 312.

According to one or more exemplary embodiments described herein, as the saliency ratio is increased by making the rotor pole asymmetric, power density of the motor may be improved, and thereby the manufacturing costs may be reduced, even while using the same amount of permanent magnet. Additionally, according to one or more exemplary embodiments, an increase in the number of turns of coil around each stator may be possible within a specified voltage range due to the reduction of d-axis inductance, which results in achieving a high degree of freedom in design.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A rotor comprising:

a rotor core; and a plurality of rotor poles arranged circumferentially around the rotor core, wherein each of the plurality of rotor poles is formed in an asymmetric shape, and wherein each of the plurality of rotor poles comprises:

a permanent magnet embedded in the rotor core, the permanent magnet oriented such that a longest dimension of the permanent magnet is a length which extends along a circumferential direction of the rotor core, wherein the length of the permanent magnet is greater than a thickness of the permanent magnet, wherein the thickness extends in a radial direction of the rotor core, and wherein the permanent magnet comprises a right portion having a first length and a first thickness along the radial direction of the rotor core, wherein the first thickness is consistent over the first length, and a left portion having a second length and a second thickness, different from the first thickness, along a the radial direction of the rotor core, wherein the second thickness is consistent over the second length, wherein a first side of the right portion facing the rotor core and a first side of the left portion facing the rotor core form a continuous straight line.

2. The rotor of claim 1, wherein the rotor core comprises a plurality of flux barriers, wherein, for each permanent magnet, one flux barrier is in contact with a side of the right portion and another flux barrier is in contact with a side of the left portion.

3. The rotor of claim 1, wherein the permanent magnet comprises the right portion and the left portion without any intermediary portions therebetween.

* * * * *